W. BAILEY.
Machines for Stretching and Drying Cloth.
No. 139,038. Patented May 20, 1873.
Fig: 1
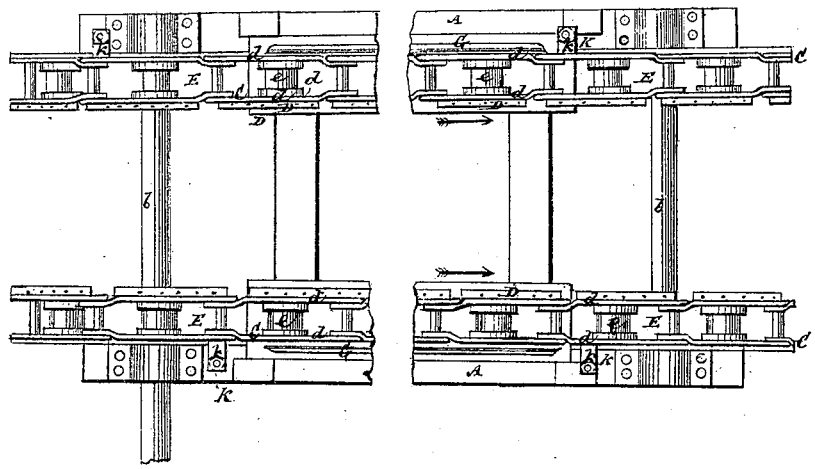
Fig: 2
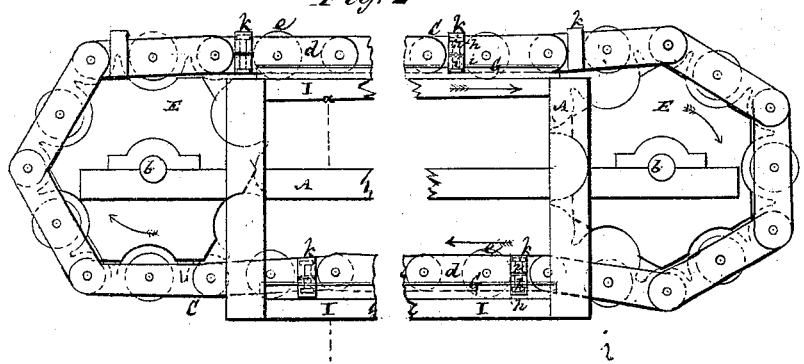
Fig: 3
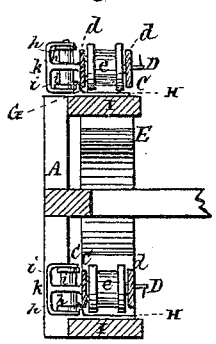
Fig. 4.
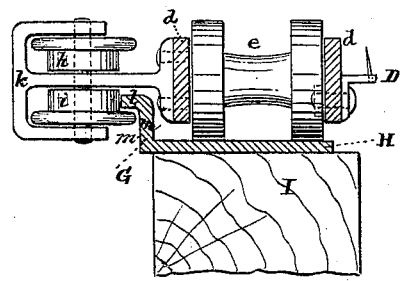
Witnesses: William Bailey
per Brown & Allen
Attorneys

UNITED STATES PATENT OFFICE.

WILLIAM BAILEY, OF BROOKLYN, ASSIGNOR TO GEORGE B. SLOAN, OF OSWEGO, NEW YORK.

IMPROVEMENT IN MACHINES FOR STRETCHING AND DRYING CLOTH.

Specification forming part of Letters Patent No. 139,038, dated May 20, 1873; application filed December 13, 1872.

*To all whom it may concern:*

Be it known that I, WILLIAM BAILEY, formerly of Oswego, in the State of New York, now of Brooklyn, Kings county, New York, have invented certain new and useful Improvements in Machines for Sizing, Stretching, and Drying Cloth, of which the following is a specification:

This invention, which is an improvement on the machine for which Letters Patent No. 127,731 were granted to me June 11, 1872, relates to machines of the class above referred to, in which the cloth is secured at its edges by tenter-hooks, or their equivalents, to endless traveling-carriers, preferably arranged to slightly diverge from each other as they travel toward the rear machine, in order to increase the stretching strain on the cloth. My invention more particularly has reference to these endless carriers and their intermediate connections—that is to say, the devices by which they are supported and held in place during their movement—and no description, therefore, need be given of the other portions of the machine usually employed in concert with them—such as the sizing-trough, brushes for evenly distributing the size over the surface of the cloth, fans for drying it, &c. In lieu of endless flexible belts of gutta-percha, or its equivalent, as described in my aforesaid Letters Patent, I now employ endless chains composed of double links, carrying friction-rollers in between them, the tenter-hook sections being attached to the interior opposite faces of the two endless chains at about the vertical center of the links—that is to say, extending along a line about midway between the top and bottom edges of the links—and pitched wheels or drums being provided, over which the chains pass, and by the rotation of which said chains are moved. This change in the construction of the carriers has necessitated not only a new organization and arrangement of the tracks over which the carriers move in their passage from drum to drum, and of the guide-rails and sheaves and flanged rollers by means of which, during such passage, the chains are kept in their proper position and held apart and guided, but also a new construction of the sheaves and rollers in order to adapt them for such use. It is in this novel organization, arrangement, and construction of the parts above specified, in connection with the endless carrier-chains, that my invention is comprised.

The nature of my invention, and the manner in which the same is or may be carried into effect, will be readily understood by reference to the accompanying drawing, in which—

Figure 1 is a plan of the frame of a machine with my improvements applied thereto. Fig. 2 is an elevation of the same. Fig. 3 is a transverse section in part on the line $x\, x$, Fig. 2; and Fig. 4 is a transverse vertical section, on an enlarged scale, through the upper part of one of the chains, representing more clearly the arrangement and construction of the parts in which my invention is principally found.

Similar letters of reference indicate corresponding parts.

A A are the side frames of the machine, having arranged at opposite ends pitched wheels or drums E E in pairs, to the shaft $b$ of either of which motion is communicated by suitable means to set and keep in motion the endless chains C, which pass around the drums. These chains, by means of which the cloth is carried and stretched, are composed of double links $d\, d$, attached by joint-pins at their ends, and carrying friction-rollers $e$ between them, which are designed, principally, to roll on and above metallic surface plates or tracks H, supported on sills or beds I. The chains, both above and below the drums, run upon these tracks, which are necessary in order to support the chains as they pass from drum to drum. Alongside of the tracks are fixed upright guide-rails G G, each formed at the top with an outwardly-turned horizontal flange, $l$. These rails are provided to accommodate the sheaves $k$, each of which carries two rollers, $h\, i$, arranged one above the other, flanged at their exterior opposite ends, and capable of revolving freely and independently of each other on an axis or axes carried by the sheave. The proportions of these rollers and the guide-rails are, preferably, such that when the two engage the roller will run over the vertical edge of the flanged part $l$ of the rail without the flange on the roller coming in contact with the main exterior vertical face $m$ of the rail.

As shown in the drawing, the roller $i$ of each sheave will engage the guide-rail on the upper track; but in the progress of the chain to and around and below the drums, the roller $i$ reverses its position and ceases to be operative, and the roller $h$ now comes into play and engages the lower guide-rail. Thus, during the movement of the chains, the rollers $i\ h$ alternately are brought into operation to properly guide the chains, and to resist the inward pull upon the latter occasioned by the strain of the stretched goods. The tenter-hook sections D are secured to the interior opposite sides of the chains in a line extending about midway between the top and bottom edges of the links, and the central stems of the sheaves $k$ are secured to the chains in a similar location on the exterior opposite sides of the same. Thus the double sheaves are arranged exactly in the line of draft, which allows them to operate to the best advantage, avoiding, as far as possible, liability of the tilting of the chains and of other irregularities of movement which would be apt to result in injury to the cloth during its passage through the machine, or in impeding the movement of the apparatus.

The central stems of the sheaves should not be allowed to come in contact with the guide-rails, and all unnecessary friction should be avoided, since, by reason of the great number of sheaves and pulleys employed in machines of this character—fifteen hundred sheaves and three thousand rollers being often used in ordinary machines—friction, which would be of little importance in a small number of sheaves, assumes great importance and presents a very serious obstacle when as many sheaves as above mentioned are used. For the same reason the weight of the sheaves must be reduced as far as possible, in order to prevent them from dragging down and tilting the chains; and the employment of the two independent single-flanged rollers is of material advantage in this regard. Each roller should also have a slight vertical play on its pin or axis to enable it to run freely. The flanges of the rollers come into play only when required to resist any tendency of the rollers to leave the guide-rails, which, at times, happens in consequence of some irregularity in the strain of the cloth.

Having now described my invention, and the manner in which the same is or may be carried into effect, what I claim, and desire to secure by Letters Patent, is—

The combination, with the endless carrier-chains and the tracks above and upon which they move between the drums, of the flanged side guide-rails and the sheaves attached to the exterior opposite faces of the carrier-chains in a line coinciding with the line of draft of the tenter - hooks, and independent single-flanged rollers, (two for each sheave,) formed and arranged therein, as described, to engage said guide-rails, substantially in the manner and for the purposes shown and set forth.

WILLIAM BAILEY.

Witnesses:
  FRED. HAYNES,
  MICHAEL RYAN.